(12) United States Patent
Xin et al.

(10) Patent No.: US 12,348,348 B2
(45) Date of Patent: Jul. 1, 2025

(54) DATA MODULATION METHOD AND APPARATUS, DEVICE, AND STORAGE MEDIUM

(71) Applicant: ZTE CORPORATION, Shenzhen (CN)

(72) Inventors: Yu Xin, Shenzhen (CN); Tong Bao, Shenzhen (CN); Guanghui Yu, Shenzhen (CN); Liujun Hu, Shenzhen (CN); Jin Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 299 days.

(21) Appl. No.: 18/008,545

(22) PCT Filed: May 27, 2021

(86) PCT No.: PCT/CN2021/096221
§ 371 (c)(1),
(2) Date: Dec. 6, 2022

(87) PCT Pub. No.: WO2021/258974
PCT Pub. Date: Dec. 30, 2021

(65) Prior Publication Data
US 2023/0216723 A1 Jul. 6, 2023

(30) Foreign Application Priority Data
Jun. 22, 2020 (CN) .......................... 202010576321.1

(51) Int. Cl.
*H04L 27/26* (2006.01)
(52) U.S. Cl.
CPC .............................. *H04L 27/2634* (2013.01)

(58) Field of Classification Search
None
See application file for complete search history.

(56) References Cited

U.S. PATENT DOCUMENTS

2008/0181326 A1* 7/2008 Krueger .............. H04L 27/0008
375/261
2015/0341190 A1* 11/2015 Cipriano .......... H04L 25/03076
375/232

(Continued)

FOREIGN PATENT DOCUMENTS

CN 106713213 A 5/2017
CN 107846377 A 3/2018

(Continued)

OTHER PUBLICATIONS

Extended European Search Report in Application No. 21828430.5, dated Jun. 25, 2024, 11 pages.

(Continued)

*Primary Examiner* — Diane L Lo
(74) *Attorney, Agent, or Firm* — Morgan, Lewis & Bockius LLP

(57) ABSTRACT

Provided are a data modulation method and apparatus, a device, and a storage medium. The data modulation method includes modulating a data sequence by using N constellation point modulation symbols $\{S(n)\}$, where the N constellation point modulation symbols are divided into two groups of modulation symbols, the phase difference between the two groups of modulation symbols is a preset angle, n is an integer from 0 to N−1, and N is an even integer greater than or equal to 4; and transmitting, on a physical resource, data symbols obtained after modulation.

20 Claims, 6 Drawing Sheets

(56) References Cited

U.S. PATENT DOCUMENTS

2018/0062904 A1* 3/2018 Hwang ............... H04L 27/2615
2018/0227081 A1* 8/2018 Park .................... H04B 7/0617
2020/0322201 A1* 10/2020 Kuchi ................. H04L 27/2636

FOREIGN PATENT DOCUMENTS

| CN | 110557219 A | 12/2019 |
| CN | 111901276 A | 11/2020 |
| EP | 2797276 A1 | 10/2014 |
| EP | 2947799 A1 | 11/2015 |
| JP | 2009147637 A | 7/2009 |
| JP | 2015536584 A | 12/2015 |
| WO | WO2018149570 A1 | 8/2018 |

OTHER PUBLICATIONS

Kashyap et al: "The performance of CDMA system using pi/4-shift QPSK and pi/2-shift BPSK with the nonlinearity of HPA", IEEE International Symposium on Personal, Indoor and Mobile Radio Communications. Pimrc, XX, XX, Oct. 15, 1996 (Oct. 15, 1996), pp. 492-496.

Choi Jeonghoon et al: "Widely-Linear 1-15 Nyquist Criteria for OFT-Spread OFDM of Constellation-Rotated PAM Symbols", IEEE Transactions on Communications, IEEE Service Center, Piscataway, NJ. USA, vol. 69, No. 5, Feb. 1, 2021 (Feb. 1, 2021), pp. 2909-2922.

Indian Office Action for Application No. 202327002951 dated Mar. 22, 2024, 6 pages.

Japanese Office Action for Application No. 2022-577692 dated Feb. 13, 2024, 8 pages including translation.

Kawasaki et al., "A Study of PAPR Reduction of DFT-s-OFDM Signals via Phase Rotation", IEICE Technical Report, 2019, vol. 118 No. 489, pp. 15-20.

Peruga Nasarre, Ismael, "Physical Waveform Research for Beyond 52.6 GHZ in 5G NR Networks", Tampere University, Master of Science Thesis, Dec. 2019, pp. 1, 25-36.

International Search Report in Application No. PCT/CN2021/096221 dated Aug. 19, 2021, 4 pages including translation.

* cited by examiner

DATA MODULATION METHOD AND APPARATUS, DEVICE, AND STORAGE MEDIUM

CROSS-REFERENCE TO RELATED APPLICATIONS

This is a National Stage Application, filed under 35 U.S.C. 371, of International Patent Application No. PCT/CN2021/096221, filed on May 27, 2021, which claims priority to Chinese Patent Application No. 202010576321.1, filed with the China National Intellectual Property Administration (CNIPA) on Jun. 22, 2020, the disclosures of which are incorporated herein by reference in their entireties.

TECHNICAL FIELD

The present application relates to the technical field of communications, for example, a data modulation method and apparatus, a device, and a storage medium.

BACKGROUND

A high-frequency scenario is an important scenario for beyond 5th generation mobile networks or beyond 5th generation wireless systems (B5G) or 6th generation mobile networks or 6th generation wireless systems (6G) in the future. In the high-frequency scenario, phase noise is relatively large, even if phase compensation is made at a receiving end, there is a lot of residual phase noise.

SUMMARY

The present application provides a data modulation method and apparatus, a device, and a storage medium to better resist the influence of phase noise.

An embodiment of the present application provides a data modulation method. The method includes the following, a data sequence is modulated by using N constellation point modulation symbols {S(n)}, where the N constellation point modulation symbols are divided into two groups of modulation symbols, the phase difference between the two groups of modulation symbols is a preset angle, n is any integer from 0 to N−1, and N is an even integer greater than or equal to 4; and data symbols obtained after modulation are transmitted on a physical resource.

An embodiment of the present application provides a data modulation apparatus. The apparatus includes a modulation module and a transmission module.

The modulation module is configured to modulate a data sequence by using N constellation point modulation symbols {S(n)}. The N constellation point modulation symbols are divided into two groups of modulation symbols. The phase difference between the two groups of modulation symbols is a preset angle. n is any integer from 0 to N−1. N is an even integer greater than or equal to 4. The transmission module is configured to transmit, on a physical resource, data symbols obtained after modulation.

An embodiment of the present application provides a device. The device includes one or more processors and a memory.

The memory is configured to store one or more programs. When executed by the one or more processors, the one or more programs cause the one or more processors to implement the data modulation method in the embodiment of the present application.

An embodiment of the present application provides a storage medium. The storage medium stores a computer program which, when executed by a processor, implements the method in the embodiment of the present application.

Embodiments of the present application provide a data modulation method and apparatus, a device, and a storage medium, a data sequence is modulated by using N constellation point modulation symbols {S(n)}, where the N constellation point modulation symbols are divided into two groups of modulation symbols, the phase difference between the two groups of modulation symbols is a preset angle, n is any integer from 0 to N−1, and N is an even integer greater than or equal to 4; and data symbols obtained after modulation are transmitted on a physical resource, so as to better resist the influence of phase noise.

DETAILED DESCRIPTION

Embodiments of the present application are described below in conjunction with drawings.

The steps illustrated in the flowchart among the drawings may be performed by, for example, a computer system capable of executing a set of computer-executable instructions. Moreover, although logical sequences are illustrated in the flowchart, in some cases, the illustrated or described steps may be executed in sequences different from the sequences described herein.

The data modulation method provided in the embodiments may be applied to a variety of communication formats, including, but not limited to, a global system for mobile communications (GSM), a code division multiple access (CDMA), a wideband code division multiple access (WCDMA), a long term evolution (LTE), a future 5G network format, a wireless local area network (WLAN), a worldwide interoperability for microwave access (WiMAX), Bluetooth, infrared, and other communication formats.

Figure 1:
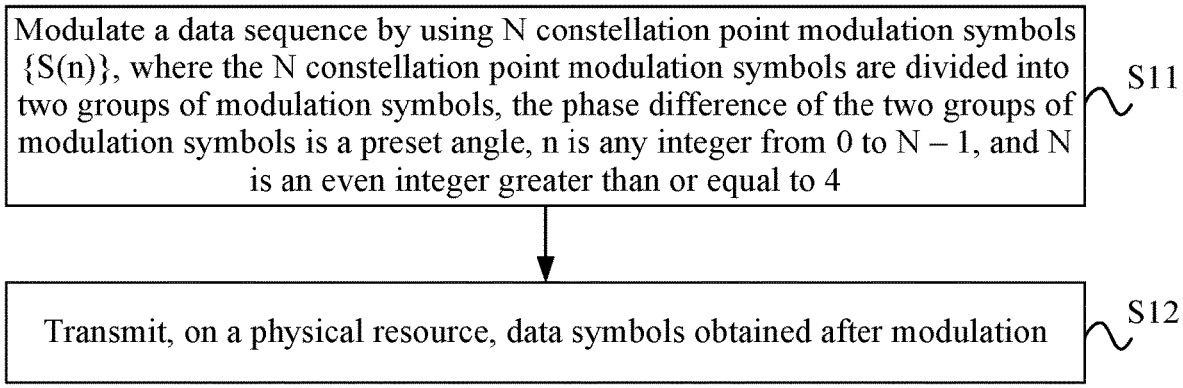
FIG. 1 is a flowchart of a data modulation method according to an embodiment of the present application.

In an embodiment, a data modulation method is provided. As shown in FIG. 1, the data modulation method provided in this embodiment of the present application mainly includes S11 and S12.

In S11, N constellation point modulation symbols {S(n)} are used to modulate a data sequence. The N constellation point modulation symbols are divided into two groups of modulation symbols. The phase difference between the two groups of modulation symbols is a preset angle. n is any integer from 0 to N−1. N is an even integer greater than or equal to 4.

In S12, data symbols obtained after modulation are transmitted on a physical resource.

In this embodiment, the data sequence may be a data sequence of binary bits. The data sequence of binary bits may be obtained after coding.

An original binary data sequence is acquired. Processing such as source coding and channel coding or interleaved coding is performed on the original data sequence, and a data sequence of binary bits is obtained after the coding processing. The source coding methods include, but are not limited to, Shannon coding, Feno coding, and Huffman coding. The channel coding methods include, but are not limited to, parity check coding, cyclic redundancy check (CRC) coding, Turbo coding, low density parity check (LDPC) coding, and so on.

In an embodiment, one group of modulation symbols have the same phase, and the other group of modulation symbols have the same phase. The phase difference between these two groups of modulation symbols is 180°.

In this embodiment, the phase difference between the two groups of modulation symbols is $\pi$. The influence of phase noise can be better resisted due to the large phase difference.

In an embodiment, each group of modulation symbols include the same number of modulation symbols, and the same number of modulation symbols is half of N.

In an embodiment, using the N constellation point modulation symbols {S(n)} to modulate the data sequence includes modulating the data sequence by alternately using the constellation point modulation symbols {S(n)} and constellation point modulation symbols $\{e^{j\theta}S(n)\}$ after the phase change of $\theta$. e is a natural constant, j is an imaginary unit, and $\theta$ is equal to $\pi/2$ or $-\pi/2$.

The constellation point modulation symbols {S(n)} and the constellation point modulation symbols $\{e^{j\theta}S(n)\}$ after the phase change of $\theta$ are alternately used for modulating the data sequence, so that the phase difference between adjacent modulation symbols may be less than $\pi$. When $\theta=\pm\pi/2$, the phase difference between adjacent modulation symbols is $\pm\pi/2$ so that the peak-to-average power ratio of modulated data signals is relatively small.

In an embodiment, the constellation point modulation symbols {S(n)} and the constellation point modulation symbols $\{e^{j\theta}S(n)\}$ after the phase change of $\theta$ are different constellation point modulation symbol sets.

In an embodiment, modulating the data sequence by alternately using the constellation point modulation symbols {S(n)} and the constellation point modulation symbols $\{e^{j\theta}S(n)\}$ after the phase change of $\theta$ includes modulating, by taking a data sequence of M binary bits as a unit, the data sequence by alternately using the constellation point modulation symbols {S(n)} and the constellation point modulation symbols $\{e^{j\theta}S(n)\}$ after the phase change of $\theta$. M is the logarithm to the base 2 of N.

In this embodiment, every data sequence of $\log_2 N$ binary bits is taken as a unit, and the data sequence is modulated by using $\{e^{j\theta k}S(n)\}$. k denotes the position number of a modulated data symbol, and k=0, 1, . . . , K−1. k=0 denotes the first data symbol. K denotes the number of modulated data symbols. $\theta=\pi/2$.

In an embodiment, at least one binary bit of data in the M binary bits of data is modulated by different phases of the constellation point modulation symbols {S(n)}.

In an embodiment, modulating the data sequence by alternately using the constellation point modulation symbols {S(n)} and the constellation point modulation symbols $\{e^{j\theta}S(n)\}$ after the phase change of $\theta$ includes modulating the data sequence by using constellation point modulation symbols $\{e^{j\theta k}S(n)\}$ carrying the position number of data symbols. k denotes the position number of the data symbols, and k is any integer from 0 to K−1. K denotes the number of modulated data symbols.

In an embodiment, for the two groups of modulation symbols, the modulus values of modulation symbols in each group are different. The modulus value of any modulation symbol in one group is equal to the modulus value of one modulation symbol in the other group.

The modulus values of modulation symbols in each group are different. Different modulation symbols can be simply distinguished according to different power. The value of N is increased, that is, the larger the value of $\log_2 N$ is, so the data transmission rate can be improved. Different modulation symbols can be distinguished according to different modulus values or different power. This is not affected by phase noise, that is, the influence of phase noise can be better resisted.

In an embodiment, for the two groups of modulation symbols, the minimum modulus value of modulation symbols in each group is greater than half of the minimum modulus value difference in the group. Alternatively, the minimum modulus value of modulation symbols in each group is greater than the minimum modulus value difference in the group.

The minimum modulus value of modulation symbols in each group is greater than half of the minimum modulus value difference in the group. This can reduce the modulus value difference between modulation symbols as much as possible so that the signal peak-to-average power ratio is lower.

In an embodiment, the data symbols obtained after the modulation are transmitted on the physical resource in the manner of transmitting the data symbols obtained after the modulation, on the time domain.

In an embodiment, the data symbols obtained after the modulation are transmitted on the physical resource in the manner where after filtering and digital-to-analog conversion are performed, the data symbols obtained after the modulation are transmitted on a radio frequency link.

In an embodiment, the data symbols obtained after the modulation are transmitted on the physical resource in the manner where after discrete Fourier transform (DFT), inverse discrete Fourier transform (IDFT), and digital-to-analog conversion are performed on the data symbols, the data symbols obtained after the modulation are transmitted on a radio frequency link.

An example of constellation point modulation symbols {S(n)} is provided in this embodiment. In FIGS. 2 to 5, diagrams of a group of constellation point modulation symbols {S(n)} are given when N=4. n=0, 1, . . . , N−1.

Figure 2:
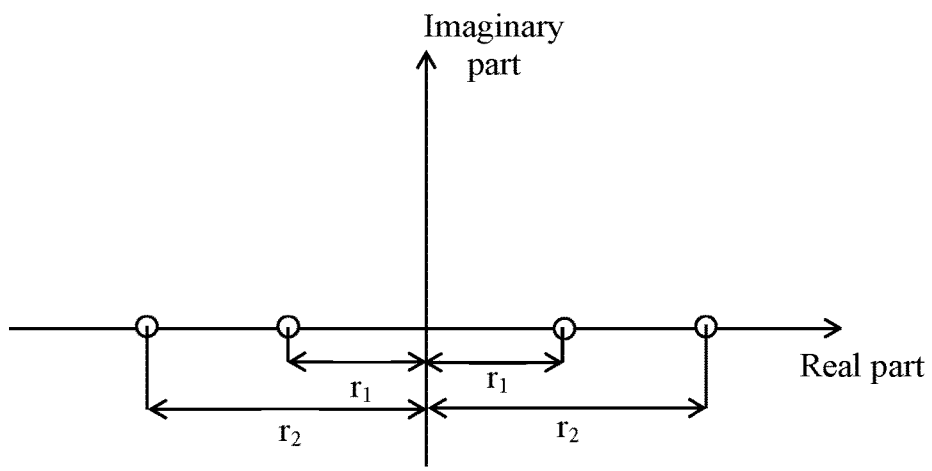
FIG. 2 is a diagram of four constellation point modulation symbols according to an embodiment of the present application.

As shown in FIG. 2, among four modulation symbols {S(n)}, there are 2 (N/2=2) modulation symbols with the same phase, and the phase is 0. The modulus values of these two modulation symbols are different, which are $r_1$ and $r_2$, respectively. The minimum modulus value $r_1$ is greater than half of the modulus value difference $((r_2-r_1)/2)$. The other 2 (N/2=2) modulation symbols also have the same phase, and the phase is π. The modulus values of these two modulation symbols are different, which are $r_1$ and $r_2$, respectively. The minimum modulus value $r_1$ is greater than half of the modulus value difference $((r_2-r_1)/2)$. In this embodiment, $r_1=r_2-r_1$. To further reduce the peak-to-average power ratio, it may be set that $r_1 > r_2-r_1$.

Figure 3:
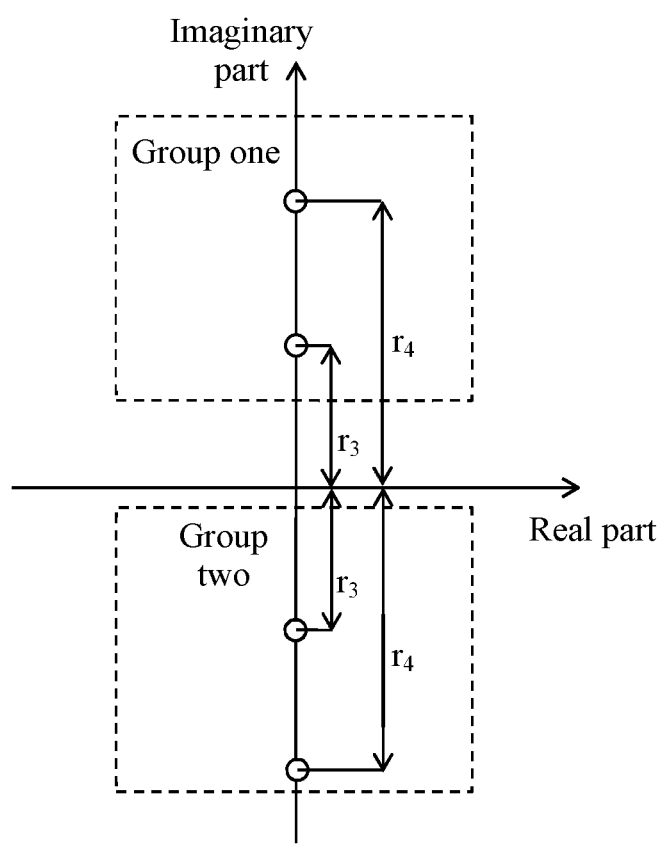
FIG. 3 is a diagram of four constellation point modulation symbols according to an embodiment of the present application.

As shown in FIG. 3, four modulation symbols {S(n)} may be divided into two groups. Group one has 2 (N/2=2) modulation symbols with the same phase, and the phase is π/2. The modulus values of the modulation symbols in group one are different, which are $r_3$ and $r_4$, respectively. Group two also has 2 (N/2=2) modulation symbols with the same phase, and the phase is 3π/2. The modulus values of the modulation symbols in group two are different, which are $r_3$ and $r_4$, respectively.

Figure 4:
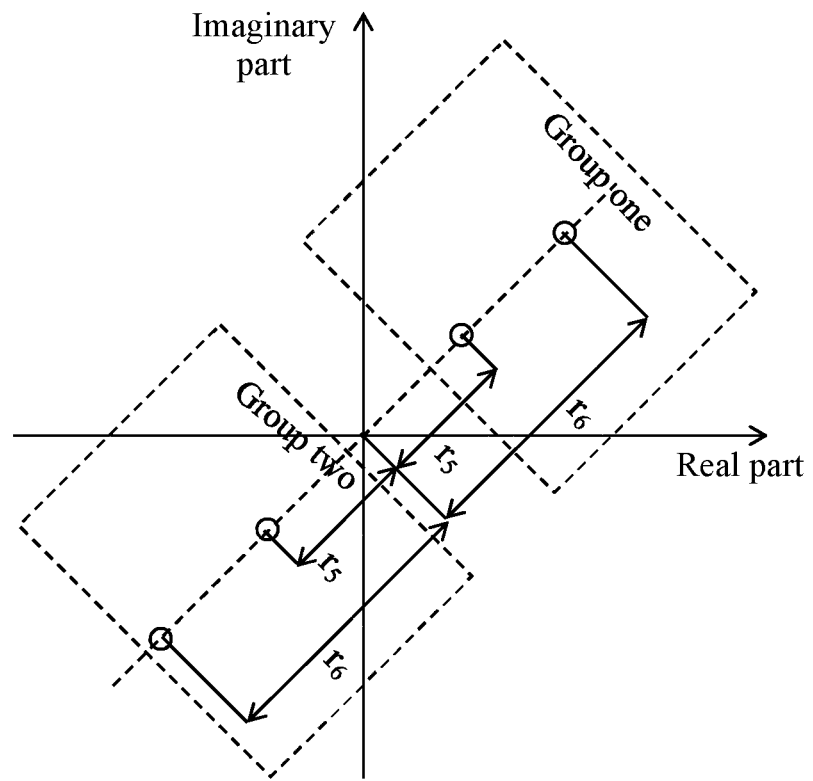
FIG. 4 is a diagram of four constellation point modulation symbols according to an embodiment of the present application.

As shown in FIG. 4, four modulation symbols {S(n)} may be divided into two groups. Group one has 2 (N/2=2) modulation symbols with the same phase, and the phase is π/4. The modulus values of the modulation symbols in group one are different, which are $r_5$ and $r_6$, respectively. Group two also has 2 (N/2=2) modulation symbols with the same phase, and the phase is 5π/4. The modulus values of the modulation symbols in group two are different, which are $r_5$ and $r_6$, respectively.

Figure 5:
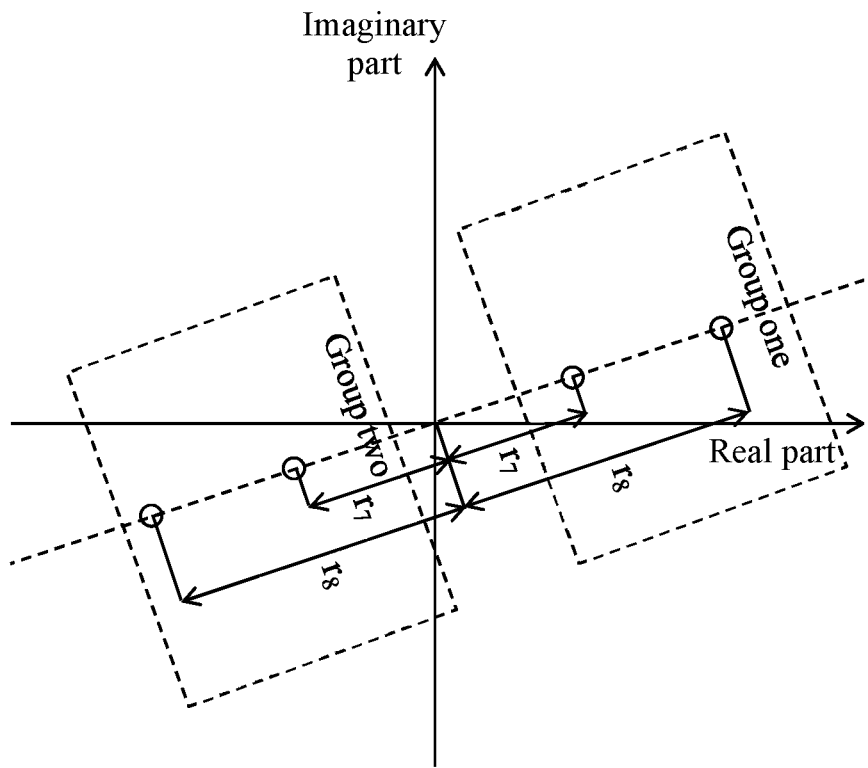
FIG. 5 is a diagram of four constellation point modulation symbols according to an embodiment of the present application.

As shown in FIG. 5, four modulation symbols {S(n)} may be divided into two groups. Group one has 2 (N/2=2) modulation symbols with the same phase, and the phase is φ. The modulus values of the modulation symbols in group one are different, which are $r_7$ and $r_8$, respectively. Group two also has 2 (N/2=2) modulation symbols with the same phase, and the phase is π+φ. The modulus values of the modulation symbols in group two are different, which are $r_7$ and $r_8$, respectively.

One group of constellation point modulation symbols {S(n)} provided in FIGS. 2 to 5 may be obtained by rotation of any group of constellation point modulation symbols {$e^{j\theta}$S(n)}. φ may be equal to any value. In FIGS. 2 to 5, N/2 modulation symbols in group one have the same phase, and N/2 modulation symbols in group two have the same phase. The phase difference between the modulation symbols in group one and the modulation symbols in group two is π. In FIGS. 2 to 5, the modulus values of the N/2 modulation symbols in group one are different, and the modulus values of the N/2 modulation symbols in group two are different. The modulus value of one modulation symbol in group one is equal to the modulus value of one modulation symbol in group two.

Figure 6:
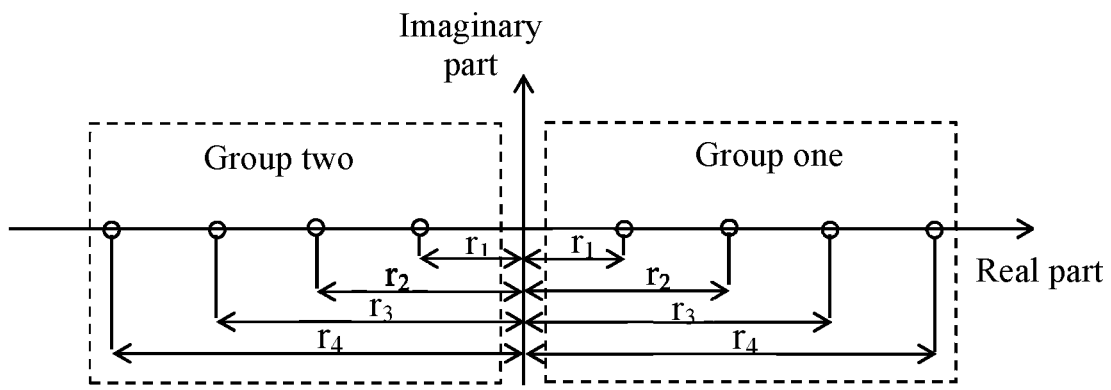
FIG. 6 is a diagram of eight constellation point modulation symbols according to an embodiment of the present application.

FIG. 6 is an example of the constellation point modulation symbols {S(n)}. As shown in FIG. 6, a diagram of a group of constellation point modulation symbols {S(n)} is given when N=8. n=0, 1, . . . , N−1.

In FIG. 6, eight modulation symbols {S(n)} may be divided into two groups. Group one has 4 (N/2=4) modulation symbols with the same phase, and the phase is 0. The modulus values of the modulation symbols in group one are different, which are $r_1$, $r_2$, $r_3$, and $r_4$, respectively. Group two also has 4 (N/2=4) modulation symbols with the same phase, and the phase is π. The modulus values of the modulation symbols in group two are different, which are $r_1$, $r_2$, $r_3$, and $r_4$, respectively. The phase difference between the modulation symbols in group one and the modulation symbols in group two is π. In FIG. 6, the modulus value of one modulation symbol in group one is equal to the modulus value of one modulation symbol in group two. That is, the modulus value $r_1$ of the modulation symbol in group one is equal to the modulus value $r_1$ of the modulation symbol in group two. The modulus value $r_2$ of the modulation symbol in group one is equal to the modulus value $r_2$ of the modulation symbol in group two. The modulus value $r_3$ of the modulation symbol in group one is equal to the modulus value $r_3$ of the modulation symbol in group two. The modulus value $r_4$ of the modulation symbol in group one is equal to the modulus value $r_4$ of the modulation symbol in group two. The minimum modulus value $r_1$ of modulation symbols in a group is greater than half of the minimum modulus value difference in the group. To further reduce the peak-to-average power ratio, the minimum modulus value $r_1$ of modulation symbols in a group may be greater than the minimum modulus value difference in the group.

A data modulation method is provided in this embodiment.

Assuming a data sequence D of binary bits is [00000101101011111], the data is modulated by using the constellation point modulation symbols {S(n)} in FIG. 3 in the preceding embodiment, n=0, 1, . . . , N−1, and N=4, in the manner of modulating the data sequence by alternately using {S(n)} and {$e^{j\theta}$S(n)} with every data sequence of $\log_2 N$ binary bits as a unit. θ=π/2, that is, {$e^{j\theta}$S(n)}={jS(n)}.

Figure 7:
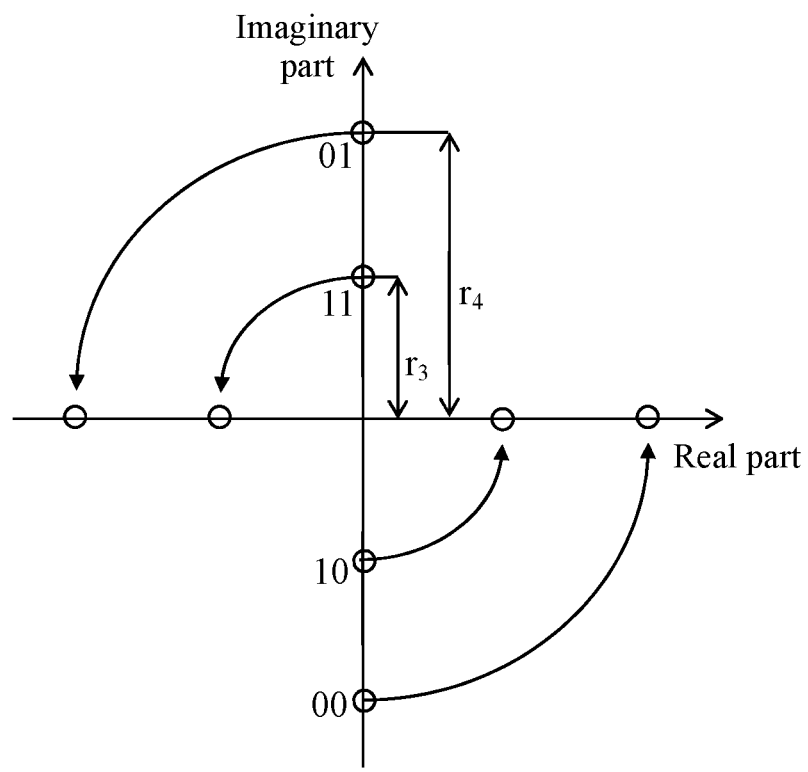
FIG. 7 is a diagram of a data modulation method according to an embodiment of the present application.

In FIG. 7, it is assumed in this embodiment that, in odd bits of the data sequence of modulation symbols, every two binary bits of data correspond to one constellation point in the constellation point modulation symbols {S(n)}. That is, 00 corresponds to $-jr_4$, 01 corresponds to $r_4$, 10 corresponds to $-jr_3$, and 11 corresponds to $r_3$. In even bits of the data sequence of modulation symbols, every two binary bits of data correspond to one constellation point in the constellation point modulation symbols {jS(n)}. That is, 00 corresponds to $r_4$, 01 corresponds to $-r_4$, 10 corresponds to $r_3$, and 11 corresponds to $-r_3$.

For the data sequence D of binary bits of [00000101101011111], every 2 ($\log_2 N = \log_2 4$) binary bits in the data sequence are a unit. The data sequence D of $[d_0 d_1 d_2 d_3 d_4 d_5 d_6 d_7]$ is modulated by alternately using {S(n)} and {jS(n)} to obtain a data symbol sequence DS, DS= $[s_0 s_1 s_2 s_3 s_4 s_5 s_6 s_7]=[-jr_4, r_4, -jr_3, r_3, jr_4, -r_4, jr_3, r_3]$. $d_0$ of [00] is modulated by using a constellation point modulation symbol {S(n)} to obtain a data symbol so of $[-jr_4]$. $d_1$ of [00] is modulated by using the constellation point modulation symbol {jS(n)} to obtain a data symbol $s_1$ of $[r_4]$. $d_2$ of [01] is modulated by using the constellation point modulation symbol {S(n)} to obtain a data symbol $s_2$ of $[-jr_3]$. $d_3$ of [01] is modulated by using the constellation point modulation symbol {jS(n)} to obtain a data symbol $s_3$ of $[r_3]$. $d_4$ of [10] is modulated by using the constellation point modulation symbol {S(n)} to obtain a data symbol $s_4$ of $[jr_4]$. $d_5$ of [10] is modulated by using the constellation point modulation symbol {jS(n)} to obtain a data symbol $s_5$ of $[-r_4]$. $d_6$ of [11] is modulated by using the constellation point modulation symbol {S(n)} to obtain a data symbol $s_6$ of $[jr_3]$. $d_7$ of [11] is modulated by using the constellation point modulation symbol {jS(n)} to obtain a data symbol $s_7$ of $[r_3]$.

In an embodiment, an example of a data modulation method is provided.

Figure 8:
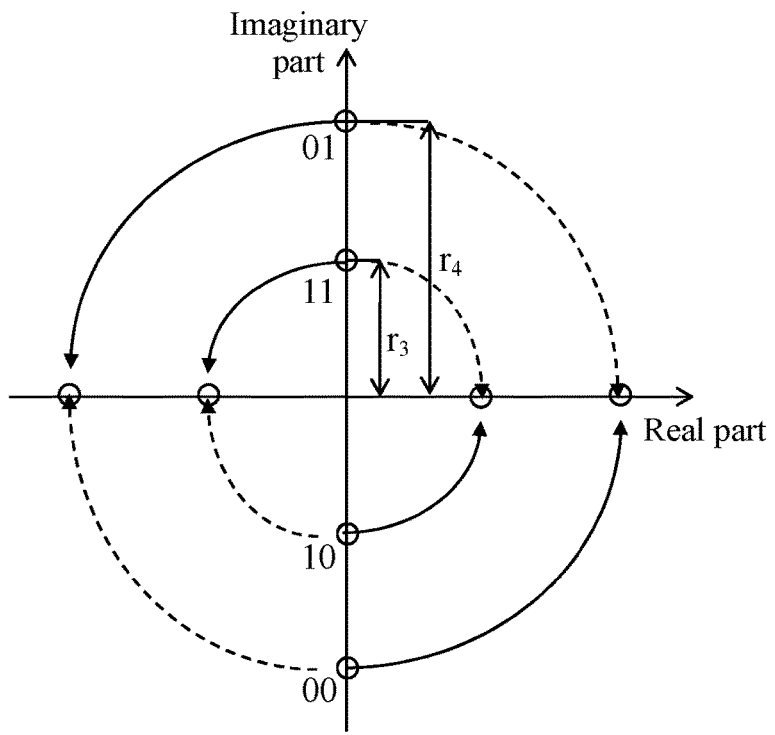
FIG. 8 is a diagram of another data modulation method according to an embodiment of the present application.

In FIG. 8, assuming a data sequence D of binary bits is [00000101101011111], the data is modulated by using the constellation point modulation symbols {S(n)} shown in FIG. 3 in the preceding embodiment, where n=0, 1, . . . , N−1, and N=4, in the manner of modulating the data sequence by using {$e^{j\theta k}$S(n)} with every $\log_2 N$ binary bits in the data sequence as a unit. k denotes the position number of the modulated data symbols, and k=0, 1, ..., K−1. k=0 denotes the first data symbol. K denotes the number of the modulated data symbols. $\theta=\pi/2$.

For the data sequence D of binary bits of [00000101101011111], every 2 ($\log_2 N = \log_2 4$) binary bits in the data sequence are a unit. The data sequence D of [$d_0 d_1 d_2 d_3 d_4 d_5 d_6 d_7$] is modulated by using $\{e^{j\theta k}S(n)\}$ to obtain a data symbol sequence DS, and DS= [$s_0 s_1 s_2 s_3 s_4 s_5 s_6 s_7$]=[−$jr_4$, $r_4$, $jr_3$, −$r_3$, $jr_4$, −$r_4$, −$jr_3$, −$r_3$]. $d_0$ of [00] is modulated by using a constellation point modulation symbol $\{\{e^{j\theta k}S(n), k=0\}=\{S(n)\}$ to obtain the first data symbol $s_0$ of [−$jr_4$]. $d_1$ of [00] is modulated by using a constellation point modulation symbol $\{e^{j\theta k}S(n), k=1\}=\{jS(n)\}$ to obtain the second data symbol $s_1$ of [$r_4$]. $d_2$ of [01] is modulated by using a constellation point modulation symbol $\{e^{j\theta k}S(n), k=2\}=\{-S(n)\}$ to obtain the third data symbol $s_2=[jr_3]$. $d_3=[01]$ is modulated by using a constellation point modulation symbol $\{e^{j\theta k}S(n), k=3\}=\{-jS(n)\}$ to obtain the fourth data symbol $s_3$ of [−$r_3$]. $d_4$ of [10] is modulated by using a constellation point modulation symbols $\{e^{j\theta k}S(n), k=4\}=\{S(n)\}$ to obtain the fifth data symbol $s_4$ of [$jr_4$]. $d_5$ of [10] is modulated by using a constellation point modulation symbol $\{e^{j\theta k}S(n), k=5\}=\{jS(n)\}$ to obtain the sixth data symbol $s_5$ of [−$r_4$]. $d_6$ of [11] is modulated by using a constellation point modulation symbol $\{e^{j\theta k}S(n), k=6\}=\{-S(n)\}$ to obtain the seventh data symbol $s_6$ of [−$jr_3$]. $d_7$ of [11] is modulated by using a constellation point modulation symbol $\{e^{j\theta k}S(n), k=7\}=\{-jS(n)\}$ to obtain the eighth data symbol $s_7$ of [−$r_3$].

In an embodiment, a block diagram illustrating the structure of a transmitting end of a data modulation method is provided.

Figure 9:
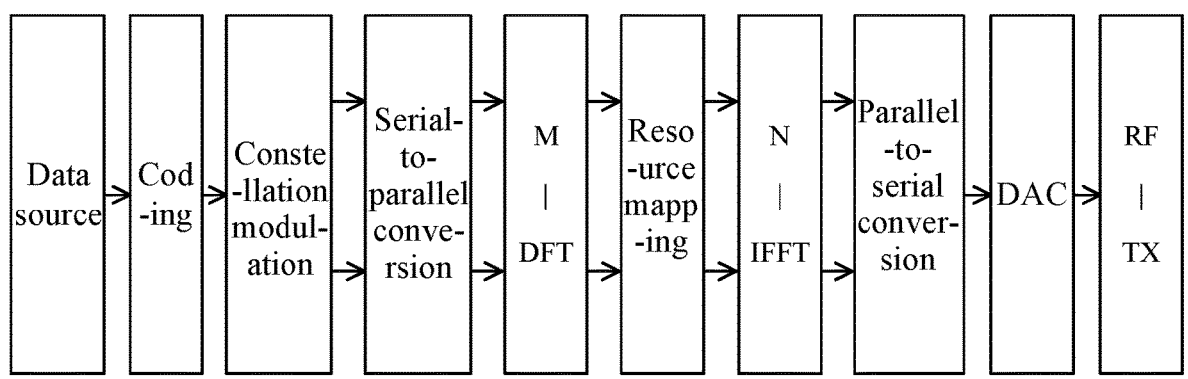
FIG. 9 is a diagram illustrating the structure of a transmitting end of a data modulation method according to an embodiment of the present application.

As shown in FIG. 9, a data sequence of binary bits through coding and constellation modulation, that is, through a data modulation method, generates modulated data symbols. After the DFT, resource mapping, IDFT, digital-to-analog conversion, and the like are processed on the data symbols, the modulated data symbols are transmitted on a radio frequency link.

Figure 10:
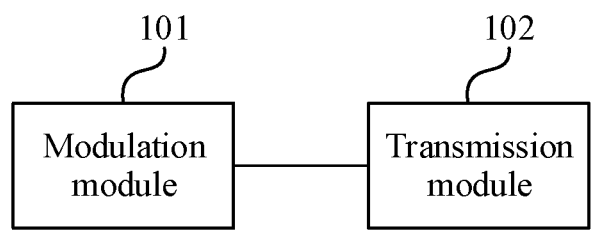
FIG. 10 is a diagram illustrating the structure of a data modulation apparatus according to an embodiment of the present application.

In an embodiment, a data modulation apparatus is provided. As shown in FIG. 10, the data modulation apparatus provided in this embodiment of the present application mainly includes a modulation module 101 and a transmission module 102. The modulation module 101 is configured to modulate a data sequence by using N constellation point modulation symbols {S(n)}. The N constellation point modulation symbols are divided into two groups of modulation symbols. The phase difference between the two groups of modulation symbols is a preset angle. n is any integer from 0 to N−1. N is an even integer greater than or equal to 4. The transmission module 102 is configured to transmit, on a physical resource, data symbols obtained after modulation.

In an embodiment, of the two groups of modulation symbols, one group of modulation symbols have the same phase, and the other group of modulation symbols have the same phase. The phase difference between the two groups of modulation symbols is 180°.

In an embodiment, the two groups of modulation symbols include the same number of modulation symbols, and the number of the modulation symbols is half of N.

In an embodiment, modulating the data sequence by using the N constellation point modulation symbols {S(n)} in the manner of modulating the data sequence by alternately using constellation point modulation symbols {S(n)} and constellation point modulation symbols $\{e^{j\theta}S(n)\}$ after the phase change of $\theta$. e is a natural constant, j is an imaginary unit, and $\theta$ is equal to $\pi/2$ or $-\pi/2$.

In an embodiment, the constellation point modulation symbols {S(n)} and the constellation point modulation symbols $\{e^{j\theta}S(n)\}$ after the phase change of $\theta$ are different constellation point modulation symbol sets.

In an embodiment, modulating the data sequence by alternately using the constellation point modulation symbols {S(n)} and the constellation point modulation symbols $\{e^{j\theta}S(n)\}$ after the phase change of $\theta$ includes modulating, by taking M binary bits of data as a unit, the data sequence by alternately using the constellation point modulation symbols {S(n)} and the constellation point modulation symbols $\{e^{j\theta}S(n)\}$ after the phase change of $\theta$. M is the logarithm to a base 2 of N.

In an embodiment, at least one binary bit of data in the M binary bits of data is modulated by different phases of the constellation point modulation symbols {S(n)}.

In an embodiment, modulating the data sequence by alternately using the constellation point modulation symbols {S(n)} and the constellation point modulation symbols $\{e^{j\theta}S(n)\}$ after the phase change of $\theta$ includes modulating the data sequence by using constellation point modulation symbols $\{e^{j\theta k}S(n)\}$ carrying the position number of data symbols. k denotes the position numbers of data symbols, and k is any integer from 0 to K−1. K denotes the number of data symbols obtained after the modulation.

In an embodiment, for the two groups of modulation symbols, the modulus values of modulation symbols in each group are different. The modulus value of any modulation symbol in one group is equal to the modulus value of one modulation symbol in another group.

In an embodiment, for the two groups of modulation symbols, the minimum modulus value of modulation symbols in each group is greater than half of the minimum modulus value difference in the group. Alternatively, the minimum modulus value of modulation symbols in each group is greater than the minimum modulus value difference in the group.

In an embodiment, the data symbols obtained after modulation are transmitted on the physical resource in the manner of transmitting the data symbols obtained after modulation on the time domain.

In an embodiment, the data symbols obtained after modulation are transmitted on the physical resource in the manner where after filtering and digital-to-analog conversion are performed, the data symbols obtained after modulation are transmitted on a radio frequency link.

In an embodiment, the data symbols obtained after modulation are transmitted on the physical resource in the manner where after DFT, IDFT, and digital-to-analog conversion are performed, the data symbols obtained after modulation are transmitted on a radio frequency link.

The data modulation apparatus provided in this embodiment can execute the data modulation method provided in any embodiment of the present application and has corresponding functional modules and effects for executing the method. Technology details that are not described in detail in this embodiment may refer to the data modulation method provided in any embodiment of the present application.

Units and modules involved in the embodiment of the preceding data modulation apparatus are just divided according to functional logic, and the division is not limited to this, as long as the corresponding functions can be implemented. In addition, the names of functional units are just intended for distinguishing and are not to limit the protection scope of the present application.

Figure 11:
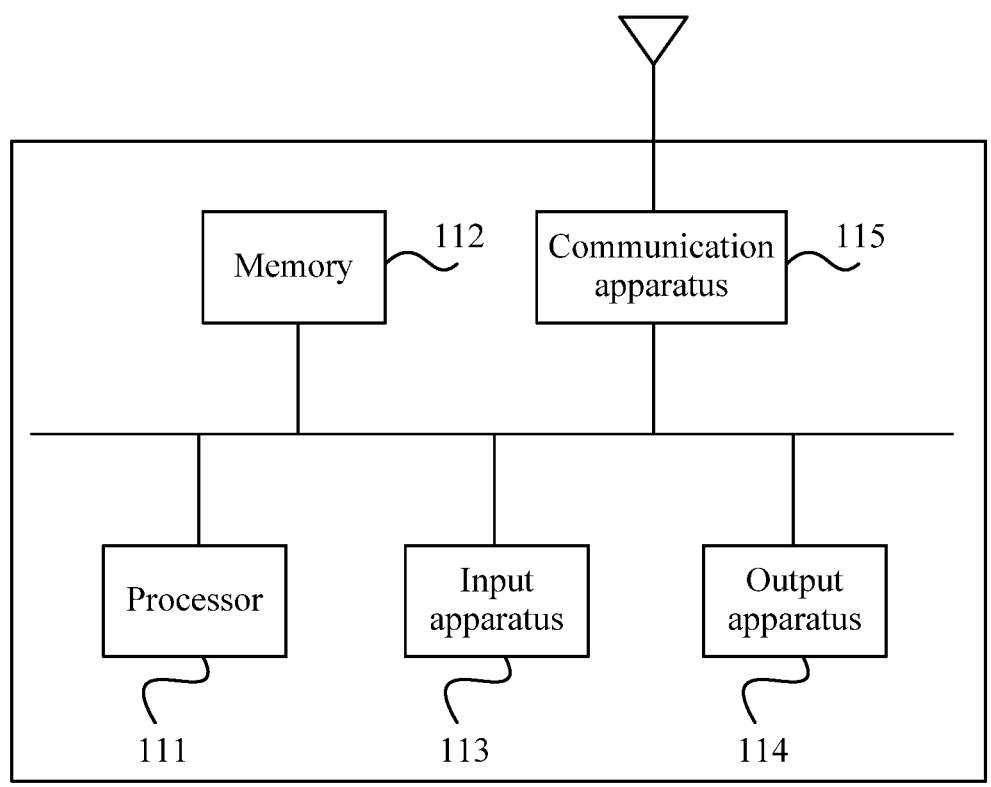
FIG. 11 is a diagram illustrating the structure of a device according to an embodiment of the present application.

An embodiment of the present application provides a device. FIG. 11 is a diagram illustrating the structure of a device according to an embodiment of the present application. As shown in FIG. 11, the device includes a processor 111, a memory 112, an input apparatus 113, an output apparatus 114, and a communication apparatus 115. One or more processors 111 may be provided in the device. One processor 111 is taken as an example in FIG. 11. The processor 111, the memory 112, the input apparatus 113, and the output apparatus 114 in the device may be connected by a bus or in other manners. Connecting by a bus is used as an example in FIG. 11.

As a computer-readable storage medium, the memory 112 may be configured to store software programs, computer-executable programs, and modules, such as program instructions/modules (for example, the modulation module 101 and the transmission module 102 that are in the data modulation apparatus) corresponding to the data modulation method in the embodiment of the present application. The processor 111 runs the software programs, instructions, and modules stored in the memory 112 to execute function applications and data processing of the device, that is, to implement the method provided in any embodiment of the present application.

The memory 112 may mainly include a program storage region and a data storage region. The program storage region may store an operating system and an application program required by at least one function. The data storage region may store data created depending on use of a device. Additionally, the memory 112 may include a high-speed random-access memory and may also include a nonvolatile memory such as at least one disk memory, a flash memory, or another nonvolatile solid-state memory. In some examples, the memory 112 may include memories which are remotely disposed relative to the processor 111, and these remote memories may be connected to the device via a network. Examples of the preceding network include, but are not limited to, the Internet, an intranet, a local area network, a mobile communication network, and a combination thereof.

The input apparatus 113 may be configured to receive inputted digital or character information and generate key signal input related to user settings and function control of the device. The output apparatus 114 may include display devices such as a display screen.

The communication apparatus 115 may include a receiver and a sender. The communication apparatus 115 is configured to perform information transceiving communication under the control of the processor 111.

In an example embodiment, an embodiment of the present application provides a storage medium including computer-executable instructions. The computer-executable instructions are used for executing a data modulation method when executed by a computer processor. The method includes the followings, a data sequence is modulated by using N constellation point modulation symbols {S(n)}, where the N constellation point modulation symbols are divided into two groups of modulation symbols, the phase difference between the two groups of modulation symbols is a preset angle, n is any integer from 0 to N−1, and N is an even integer greater than or equal to 4; and data symbols obtained after modulation are transmitted on a physical resource.

In the storage medium including computer-executable instructions provided in this embodiment of the present application, the computer-executable instructions execute not only the preceding method operations but also related operations in the data modulation method provided in any embodiment of the present application.

From the preceding description of the embodiments, the present application may be implemented by relying on both software and necessary general-purpose hardware, and also by relying on hardware. The technical solutions of the present application may essentially be embodied in the form of a software product. The software product in a computer may be stored in a computer-readable storage medium such as a floppy disk, read-only memory (ROM), random access memory (RAM), flash memory, hard disk, or compact disc in the computer and includes some instructions for enabling a computer device (which may be a personal computer, a server, or a network device) to execute the method of any embodiment of the present application.

The term user terminal encompasses any appropriate type of wireless user equipment, such as a mobile phone, a portable data processing apparatus, a portable web browser, or a vehicle-mounted mobile station.

In general, multiple embodiments of the present application may be implemented in hardware, dedicated circuits, software, logics, or any combination thereof. For example, some aspects may be implemented in hardware, and other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in the memory. The memory may be of any type suitable for a local technical environment and may be implemented by using any suitable data storage technology, for example, but not limited to, a read-only memory (ROM), a random access memory (RAM), an optical memory apparatus and system (a digital video disc (DVD), or a compact disc (CD)). The computer-readable medium may include a non-transitory storage medium. The data processor may be of any type suitable to the local technical environment, for example, but not limited to, a general-purpose computer, a special-purpose computer, a microprocessor, a digital signal processing (DSP), an application specific integrated circuit (ASIC), a field-programmable gate array (FPGA), or a processor based on a multi-core processor architecture.

What is claimed is:
1. A data modulation method, comprising:
modulating a data sequence by using N constellation point modulation symbols {S(n)}, wherein the N constellation point modulation symbols are divided into two groups of modulation symbols, one group of the two groups of modulation symbols have a same phase, the other group of the two groups of modulation symbols have a same phase, a phase difference between the two groups of modulation symbols is 180°, n is an integer from 0 to N−1, and N is an even integer greater than or equal to 4; and transmitting, on a physical resource, data symbols obtained after modulation;

wherein modulating the data sequence by using the N constellation point modulation symbols {S(n)} comprises:

modulating the data sequence by alternately using the constellation point modulation symbols {S(n)} and constellation point modulation symbols {$e^{j\theta}$S(n)} after a phase change of θ, wherein e is a natural constant, j is an imaginary unit, and θ is equal to π/2 or −π/2.

2. The method of claim 1, wherein the two groups of modulation symbols comprise a same number of modulation symbols, and the number of modulation symbols is N/2.

3. The method of claim 1, wherein the constellation point modulation symbols {S(n)} and the constellation point modulation symbols {$e^{j\theta}$S(n)} after the phase change of θ are different constellation point modulation symbol sets.

4. The method of claim 1, wherein modulating the data sequence by alternately using the constellation point modulation symbols {S(n)} and the constellation point modulation symbols {$e^{j\theta}$S(n)} after the phase change of θ comprises:

modulating, by taking M binary bits of data as a unit, the data sequence by alternately using the constellation point modulation symbols {S(n)} and the constellation point modulation symbols {$e^{j\theta}$S(n)} after the phase change of θ, wherein M is a logarithm to a base 2 of N.

5. The method of claim 4, wherein at least one binary bit of data in the M binary bits of data is modulated by different phases of the constellation point modulation symbols {S(n)}.

6. The method of claim 4, wherein for the two groups of modulation symbols, a minimum modulus value of modulation symbols in each group of the two groups of modulation symbols is greater than half of a minimum modulus value difference in the each group of the two groups of modulation symbols, or a minimum modulus value of modulation symbols in each group of the two groups of modulation symbols is greater than a minimum modulus value difference in the each group of the two groups of modulation symbols.

7. The method of claim 1, wherein modulating the data sequence by alternately using the constellation point modulation symbols {S(n)} and the constellation point modulation symbols {$e^{j\theta}$S(n)} after the phase change of θ comprises:

modulating the data sequence by using constellation point modulation symbols {$e^{j\theta k}$S(n)} carrying a position number of the data symbols, wherein k denotes the position number of the data symbols, k is an integer from 0 to K−1, and K denotes a number of the data symbols obtained after the modulation.

8. The method of claim 1, wherein for the two groups of modulation symbols, modulus values of modulation symbols in each group of the two groups of modulation symbols are different, and a modulus value of one modulation symbol in one group of the two groups of modulation symbols is equal to a modulus value of one modulation symbol in the other group of the two groups of modulation symbols.

9. The method of claim 1, wherein transmitting, on the physical resource, the data symbols obtained after the modulation comprises:

transmitting, on a time domain, the data symbols obtained after the modulation.

10. The method of claim 1, wherein transmitting, on the physical resource, the data symbols obtained after the modulation comprises:

after performing filtering and digital-to-analog conversion on the data symbols obtained after the modulation, transmitting, on a radio frequency link, the data symbols obtained after the modulation.

11. The method of claim 1, wherein transmitting, on the physical resource, the data symbols obtained after the modulation comprises:

after performing discrete Fourier transform (DFT), inverse discrete Fourier transform (IDFT), and digital-to-analog conversion on the data symbols obtained after the modulation, transmitting, on a radio frequency link, the data symbols obtained after the modulation.

12. A device, comprising:

at least one processor; and a memory configured to store at least one program, wherein when executed by the at least one processor, the at least one program causes the at least one processor to implement the following:

modulating a data sequence by using N constellation point modulation symbols {S(n)}, wherein the N constellation point modulation symbols are divided into two groups of modulation symbols, one group of the two groups of modulation symbols have a same phase, the other group of the two groups of modulation symbols have a same phase, a phase difference between the two groups of modulation symbols is 180°, n is an integer from 0 to N−1, and N is an even integer greater than or equal to 4; and transmitting, on a physical resource, data symbols obtained after modulation;

wherein the at least one processor is caused to implement modulating the data sequence by using the N constellation point modulation symbols {S(n)} by:

modulating the data sequence by alternately using the constellation point modulation symbols {S(n)} and constellation point modulation symbols {$e^{j\theta}$S(n)} after a phase change of θ, wherein e is a natural constant, j is an imaginary unit, and θ is equal to π/2 or −π/2.

13. The device of claim 12, wherein the two groups of modulation symbols comprise a same number of modulation symbols, and the number of modulation symbols is N/2.

14. The device of claim 12, wherein the constellation point modulation symbols {S(n)} and the constellation point modulation symbols {$e^{j\theta}$S(n)} after the phase change of θ are different constellation point modulation symbol sets.

15. The device of claim 12, wherein the at least one processor is caused to implement modulating the data sequence by alternately using the constellation point modulation symbols {S(n)} and the constellation point modulation symbols {$e^{j\theta}$S(n)} after the phase change of θ by:

modulating, by taking M binary bits of data as a unit, the data sequence by alternately using the constellation point modulation symbols {S(n)} and the constellation point modulation symbols {$e^{j\theta}$S(n)} after the phase change of θ, wherein M is a logarithm to a base 2 of N.

16. The device of claim 15, wherein at least one binary bit of data in the M binary bits of data is modulated by different phases of the constellation point modulation symbols {S(n)}.

17. The device of claim 15, wherein for the two groups of modulation symbols, a minimum modulus value of modulation symbols in each group of the two groups of modulation symbols is greater than half of a minimum modulus value difference in the each group of the two groups of modulation symbols, or a minimum modulus value of modulation symbols in each group of the two groups of modulation symbols is greater than a minimum modulus value difference in the each group of the two groups of modulation symbols.

18. The device of claim 12, wherein the at least one processor is caused to implement modulating the data sequence by alternately using the constellation point modulation symbols $\{S(n)\}$ and the constellation point modulation symbols $\{e^{j\theta}S(n)\}$ after the phase change of $\theta$ by:

modulating the data sequence by using constellation point modulation symbols $\{e^{j\theta k}S(n)\}$ carrying a position number of the data symbols, wherein k denotes the position number of the data symbols, k is an integer from 0 to K−1, and K denotes a number of the data symbols obtained after the modulation.

19. The device of claim 12, wherein for the two groups of modulation symbols, modulus values of modulation symbols in each group of the two groups of modulation symbols are different, and a modulus value of one modulation symbol in one group of the two groups of modulation symbols is equal to a modulus value of one modulation symbol in the other group of the two groups of modulation symbols.

20. A non-transitory storage medium storing a computer program which, when executed by a processor, implements the following:

modulating a data sequence by using N constellation point modulation symbols $\{S(n)\}$ wherein the N constellation point modulation symbols are divided into two groups of modulation symbols, one group of the two groups of modulation symbols have a same phase, the other group of the two groups of modulation symbols have a same phase, a phase difference between the two groups of modulation symbols is 180°, n is an integer from 0 to N−1, and N is an even integer greater than or equal to 4; and transmitting, on a physical resource, data symbols obtained after modulation;

wherein the processor is caused to implement modulating the data sequence by using the N constellation point modulation symbols $\{S(n)\}$ by:

modulating the data sequence by alternately using the constellation point modulation symbols $\{S(n)\}$ and constellation point modulation symbols $\{e^{j\theta}S(n)\}$ after a phase change of $\theta$, wherein e is a natural constant, j is an imaginary unit, and $\theta$ is equal to $\pi/2$ or $-\pi/$.

* * * * *